United States Patent
Watanabe

(10) Patent No.: US 8,038,143 B2
(45) Date of Patent: Oct. 18, 2011

(54) SHEET DELIVERY DEVICE AND IMAGE FORMING DEVICE

(75) Inventor: Koji Watanabe, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 1200 days.

(21) Appl. No.: 11/372,332

(22) Filed: Mar. 8, 2006

(65) Prior Publication Data

US 2006/0214351 A1    Sep. 28, 2006

(30) Foreign Application Priority Data

Mar. 14, 2005   (JP) .................... 2005-070914

(51) Int. Cl.
B65H 1/00    (2006.01)

(52) U.S. Cl. .............. 271/162; 271/3.14; 271/9.09

(58) Field of Classification Search ............ 271/3.14, 271/207, 145, 162, 9.01, 9.09, 213, 279; 347/104; 399/81, 9, 16
See application file for complete search history.

(56) References Cited

U.S. PATENT DOCUMENTS

| | | | | |
|---|---|---|---|---|
| 4,204,668 | A * | 5/1980 | Yanagawa ................. | 271/9.02 |
| 7,119,914 | B2 * | 10/2006 | Nakajima et al. .......... | 358/1.14 |
| 2002/0051161 | A1 * | 5/2002 | Kanazawa et al. ......... | 358/1.12 |
| 2002/0186399 | A1 * | 12/2002 | Nakajima et al. .......... | 358/1.14 |
| 2003/0222396 | A1 * | 12/2003 | Kurahashi et al. ......... | 271/207 |
| 2006/0127149 | A1 * | 6/2006 | Togashi et al. ............. | 399/392 |

FOREIGN PATENT DOCUMENTS

| | | |
|---|---|---|
| JP | 56-32151 | 4/1981 |
| JP | 62-51559 | 3/1987 |
| JP | 4-308148 | 10/1992 |
| JP | 8-190232 * | 7/1996 |
| JP | 8-289077 * | 11/1996 |
| JP | 9-286534 | 11/1997 |
| JP | 11-95504 | 4/1999 |
| JP | 2000-219386 * | 8/2000 |
| JP | 2000-281243 | 10/2000 |
| JP | 2001-151400 | 6/2001 |
| JP | 2003-182874 | 7/2003 |
| JP | 2003-182889 | 7/2003 |
| JP | 4243343 | 1/2009 |

OTHER PUBLICATIONS

English translation of detailed description section of Japanese Publication No. 8-190232.*
Apr. 27, 2010 Japanese official action in connection with counterpart Japanese patent application No. 2005-070914.
Jul. 20, 2010 Japanese office action in connection with counterpart Japanese patent application.

* cited by examiner

*Primary Examiner* — Stefano Karmis
*Assistant Examiner* — Thomas Morrison
(74) *Attorney, Agent, or Firm* — Cooper & Dunham LLP

(57) ABSTRACT

A sheet delivery device is disclosed that includes an openable and closable manual paper feeder, an openable and closable paper catch tray, a first open/close detection unit to detect an opened/closed state of the manual paper feeder, a second open/close detection unit to detect an opened/closed state of the paper catch tray, and a control unit. The control unit issues an alert in response to simultaneous occurrences of both a closed state of the paper catch tray detected by the second open/close detection unit and an open state of the manual paper feeder detected by the first open/close detection unit.

18 Claims, 10 Drawing Sheets

SHEET DELIVERY DEVICE AND IMAGE FORMING DEVICE

BACKGROUND

1. Technical Field

This disclosure generally relates to a sheet delivery device including an openable and closeable paper feed tray and an openable and closable paper catch tray in which paper fed from the paper feed tray is delivered to the paper catch tray.

2. Description of the Related Art

Japanese Laid-Open Patent Application Publication No. 2003-182889 discloses an image forming device including an openable and closable manual paper feed tray on a lateral side of a main body of the device separate from a paper feed tray and a paper feed cassette provided in the main body of the device.

Another image forming device is well-known, which device includes an openable and closable additional paper catch tray on a lateral side of the device separate from an ordinary paper catch tray provided on an upper surface of the device or in the middle of the main body of the device.

In the image forming device including both the manual paper feed tray and the additional paper catch tray, the paper manual feed tray and the paper catch tray are arranged one on each of the opposite lateral sides of the main body of the device. Thereby, the sheet delivery path from the manual paper feed tray to the paper catch tray can be configured as a substantially straight line so as to enable recording on a specialty medium such as cardboard. According to the configuration, when forming an image with a recording medium such as an OHP sheet, a postcard, or the like, a deflection of the recording medium can be prevented so as to obtain high quality printing.

However, in the conventional sheet delivery device of the image forming device including the openable and closable manual paper feed tray and paper catch tray, a user has to open the paper catch tray after the user opens the manual paper feed tray. Accordingly, there are problems in that a paper jam occurs when the user fails to open the paper catch tray, or a printed medium is not delivered to a desired paper catch tray.

BRIEF SUMMARY

In an aspect of this disclosure, there is provided a sheet delivery device and an image forming device which can facilitate user's operations and prevent a paper jam from occurring.

In an embodiment of this disclosure, a sheet delivery device includes an openable and closable manual paper feeder, an openable and closable paper catch tray, a first open/close detection unit to detect an opened/closed state of the manual paper feeder, a second open/close detection unit to detect an opened/closed state of the paper catch tray, and a control unit to issue an alert in response to simultaneous occurrences of both a closed state of the paper catch tray detected by the second open/close detection unit and an open state of the manual paper feeder detected by the first open/close detection unit.

In the above-mentioned embodiment when the paper catch tray is closed while the manual paper feed tray is opened, a predetermined alert is issued so as to prevent the user from forgetting to open the paper catch tray when the paper is fed from the manual paper feed tray. Accordingly, a paper jam can be prevented from occurring.

BRIEF DESCRIPTION OF THE DRAWINGS

Other aspects, features and advantages will become apparent from the following detailed description when read in conjunction with the accompanying drawings, in which.

DESCRIPTION OF THE PREFERRED EMBODIMENTS

In the following, embodiments of the present invention are described with reference to the accompanying drawings.

Figure 1:
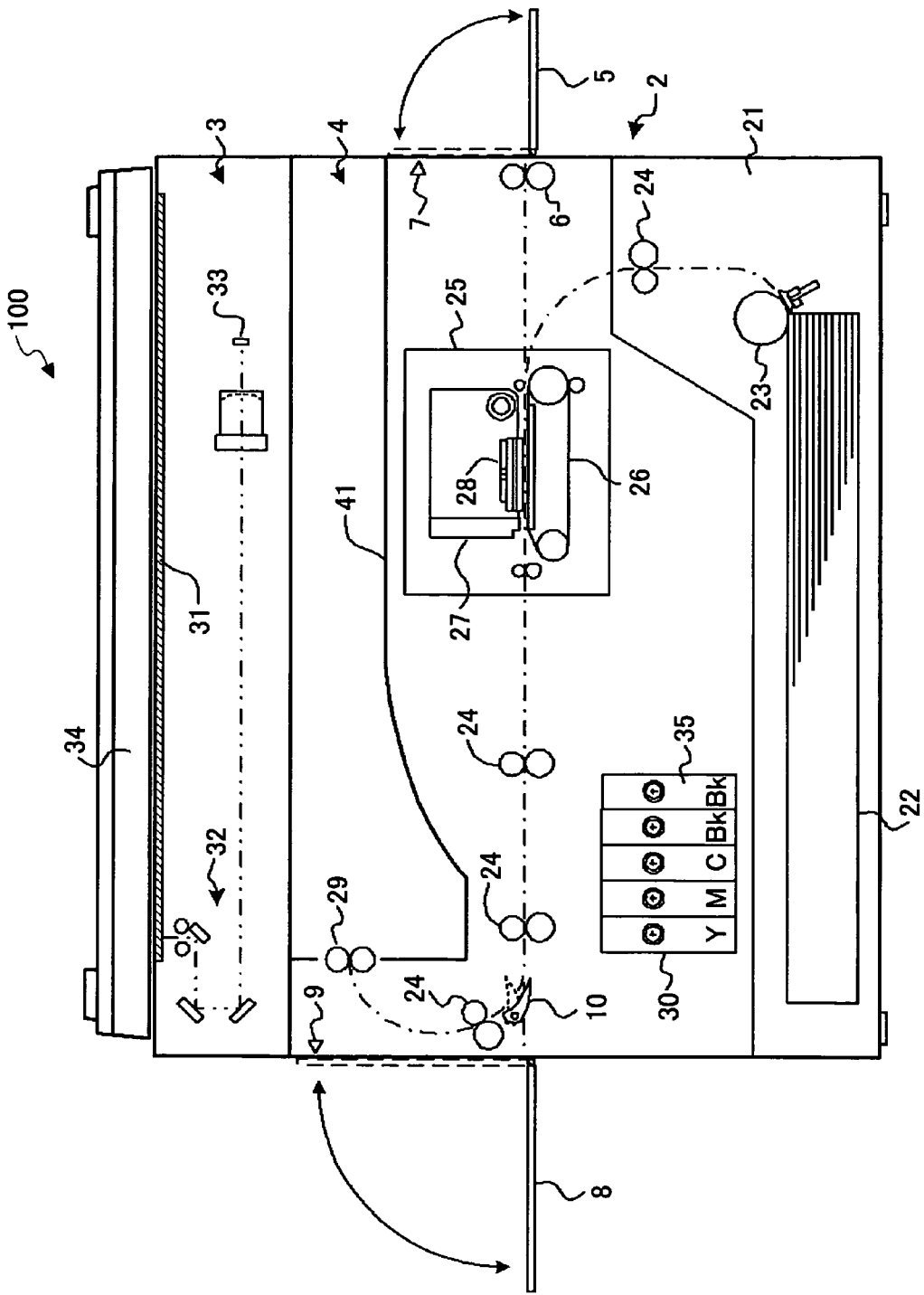
FIG. 1 is a schematic cross-sectional view of an inkjet copier device which is an example of an image forming device including a sheet delivery device according to an embodiment of the present invention.

FIG. 1 is a schematic-cross sectional view of an inkjet copier device which is an example of an image forming device including a sheet delivery device according to a first example of a first embodiment of the present invention. As shown in FIG. 1, an inkjet copier device 100 comprises a printer portion 2 provided in a lower part of the device, a scanner portion 3 provided in an upper part of the device, and a paper catch portion 4 provided between the printer portion 2 and the scanner portion 3. The inkjet copier device 100 may be configured as a multifunction machine including a printer function and a FAX function.

The scanner portion 3 comprises a scanning unit 32 scannably arranged under a contact glass 31. The original copy is read out by a reflection light from the original copy lighted by a light source which reflection light is introduced into a CCD 33 through a mirror, lens, and the like. On the contact glass 31, a platen 34 is openably and closably provided.

The printer portion 2 comprises a paper feed portion 21 in a lower part thereof, an inkjet engine 25 and an ink cartridge mounting portion 30 in an upper part thereof. As shown in FIG. 1, a manual paper feed tray 5 (a manual paper feeder) is provided on the right lateral side of the device 100. On the other hand, a paper catch tray 8 is provided on the left lateral side of the device 100.

The paper feed portion 21 comprises a paper feed cassette 22 for storing recording media such as duplex paper, and a paper feed unit 23 for feeding paper sheets one by one from the paper feed cassette 22. A recording paper delivery path from the paper feed portion 21 to the paper delivery portion 4 and a recording paper delivery path from the manual paper feed tray 5 to the paper catch tray 8 are formed as shown by an alternating long and short dash line in FIG. 1. A pair of paper delivery rollers 24 is appropriately arranged in each of predetermined positions in the recording paper delivery path so as to deliver the paper to an upper paper catch tray 41 or the paper catch tray 8.

The inkjet engine 25 adopts a paper delivery system in which an electrostatic attraction belt 26 is used. Accordingly, the inkjet engine 25 can deliver the paper more stably than the conventional roller delivery system. A carriage 27 including a print head 28 performs printing by reciprocating in a main scanning direction (direction perpendicular to the plane of the page of FIG. 1). In this example, the print head 28 is configured to include four colors per head corresponding to cyan (C), magenta (M), yellow (Y), and black (Bk). It should be noted that the number of the heads is not limited to one. For example, two colors may be configured in one head.

The inkjet copier device 100 according to the present embodiment includes ink cartridges 35 for corresponding colors which cartridges 35 are separate from the print head 28. The ink in the ink cartridges 35 is supplied to the print head 28 via a supply tube (not shown) According to the method of mounting ink cartridges for corresponding colors separately from the head, cartridges with a large volume can be used corresponding to the increase of the ink consumption with the acceleration of printing. The method is better applied to business use. Further, in the present embodiment, a couple of black ink cartridges can be mounted which black ink is consumed more than the other color ink cartridges. Accordingly, five ink cartridges 35 including yellow (Y), magenta (M), cyan (C) and two black (Bk) are installed in the cartridge mounting unit 30.

In a manual paper feed portion, a paper feed unit 6 is provided for feeding paper loaded in the manual paper feed tray 5. Further, an open/close detection sensor 7 is provided for detecting an opened/closed state of the manual paper feed tray 5. As for the open/close detection sensor 7, for example, a photo sensor, a micro switch, or the like can be used accordingly.

On the lateral side of the device 100 opposite to the manual paper feed tray 5, the paper catch tray 8 is openably and closably provided. In addition, an open/close detection sensor 9 is provided for detecting an opened/closed state of the paper catch tray 8. As for the open/close detection sensor 9, for example, a photo sensor, a micro switch, or the like may be used accordingly. Upstream of the paper catch tray 8, a switching pawl 10 is provided for switching the paper delivery direction to the upper paper catch tray 41 or to the paper catch tray 8 on the lateral side of the device 100. The switching pawl 10 is rockably provided between a position drawn by a continuous line and a position drawn by a virtual (dotted) line shown in FIG. 1. In the present embodiment, switching is mechanically performed together with opening/closing of the paper catch tray 8. In the present embodiment, when the paper catch tray 8 is opened, the switching pawl 10 is moved to the position drawn by the virtual line shown in FIG. 1. On the other hand, when the paper catch tray 8 is closed, the switching pawl 10 is moved to the position drawn by the continuous line shown in FIG. 1. Accordingly, in the present embodiment, when the paper catch tray 8 is opened, the paper is delivered to the paper catch tray 8. On the other hand, when the paper catch tray 8 is closed, the paper is delivered to the upper paper catch tray 41.

It should be noted that it is possible to use a solenoid to switch the switching pawl 10 independently from the operation of the paper catch tray 8. In this case, it is possible to deliver paper from the manual paper feed tray 5 to the upper paper catch tray 41. It is also possible to deliver paper from the paper feed cassette 22 to the paper catch tray 8.

Figure 2:
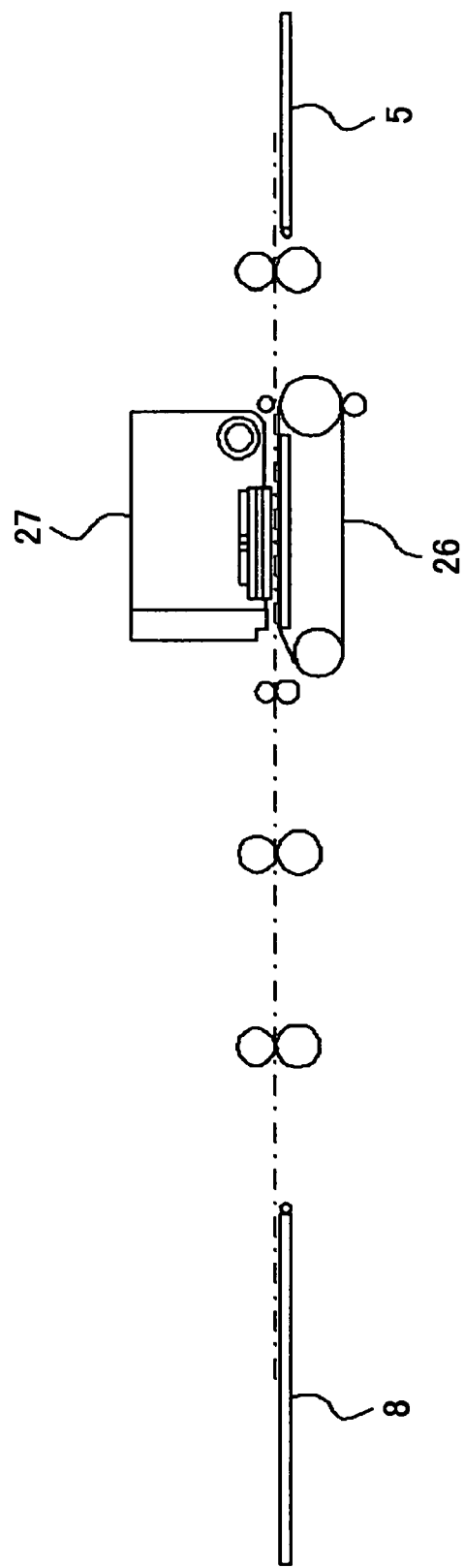
FIG. 2 is a model view simply illustrating a sheet delivery portion from the manual paper feed tray to the paper catch tray.

FIG. 2 is a model view simply illustrating a paper delivery path from the manual paper feed tray 5 to the paper catch tray 8. As shown in FIG. 2, paper (not shown) fed from the manual paper feed tray 5 is delivered by the electrostatic attraction belt (delivery belt) 26 of the inkjet engine 25 and the paper delivery rollers 24 to the paper catch tray 8. In a case where the paper is delivered from the paper feed tray 5 to the paper catch tray 8, the paper delivery path is substantially linear. Accordingly, the paper delivery path in this case is better adapted to printing on specialty paper such as cardboard, an OHP sheet, or the like. It should be noted that the paper feed unit 6 and the switching pawl 10 shown in FIG. 1 are omitted for convenience in FIG. 2.

In the present embodiment, when the user fails to open the paper catch tray 8 upon printing on paper fed from the manual paper feed tray 5, an alert is displayed.

Figure 3:
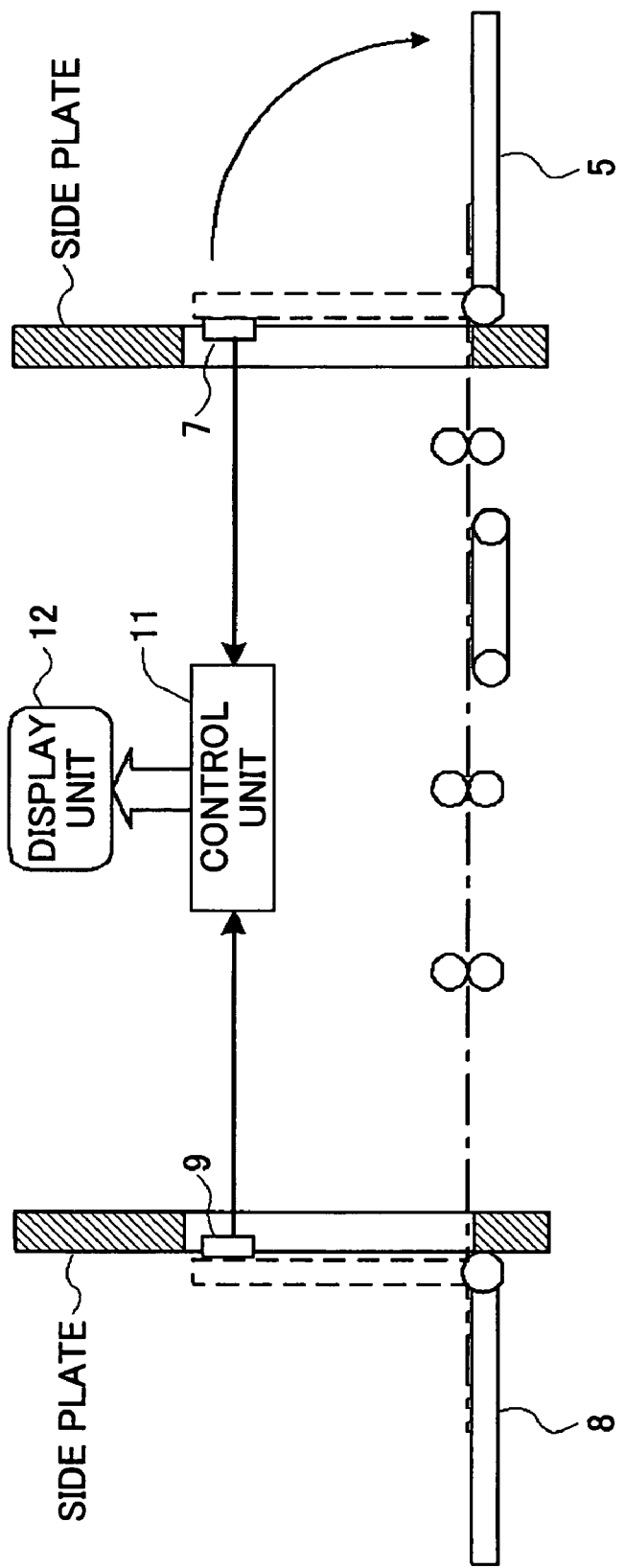
FIG. 3 is a model view conceptually illustrating a configuration for realizing an alert display.

FIG. 3 is a model view conceptionally illustrating a configuration for realizing the above alert display. As shown in FIG. 3, the open/close detection sensor 7 for detecting the opened/closed state of the manual paper feed tray 5 and the open/close detection sensor 9 for detecting the opened/closed state of the paper catch tray 8 are connected to a control unit 11. The control unit 11 determines the opened/closed state of the manual paper feed tray 5 and the paper catch tray 8 according to an output of the open/close detection sensors 7 and 9, respectively. When the manual paper feed tray 5 is opened while the paper catch tray 8 is closed, an alert such as "The paper catch tray is closed." or "Open the paper catch tray." is displayed on the display unit 12 of an operations panel. It should be noted that the alert may be sounded by such as a buzzer for notifying the user instead of being displayed on the display unit 12. Or the alert may be indicated by both the display and the sound.

Figure 4:
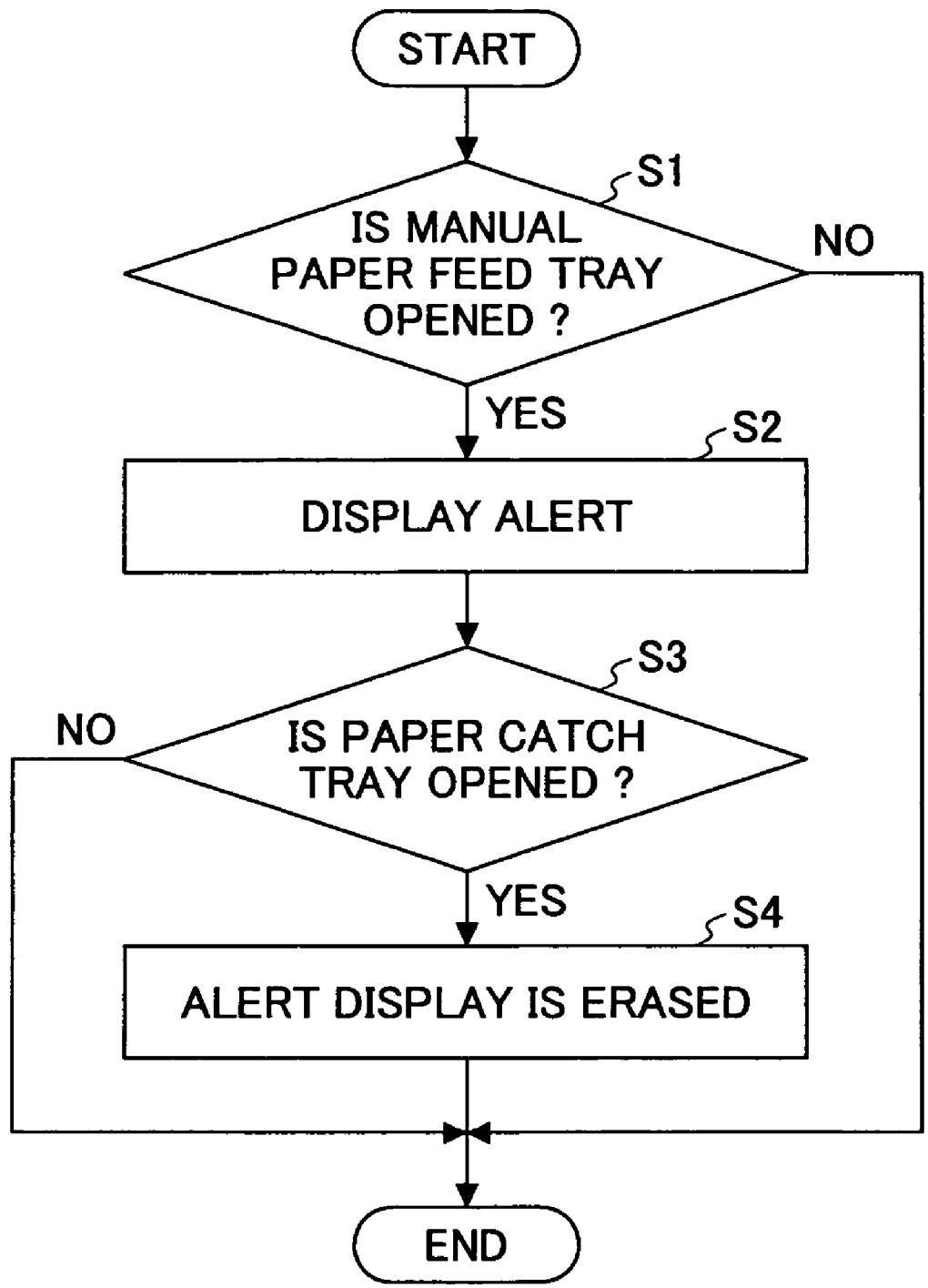
FIG. 4 is a flowchart showing steps of an alert operation.

FIG. 4 is a flowchart illustrating steps of the above alert operations. In step S1, whether the manual paper feed tray 5 is open is determined. If the manual paper feed tray 5 is opened, the alert is displayed (Step S2). Next, the control unit 11 determines whether the paper catch tray 8 is open according to the output of the open/close detection sensor 9 (Step S3). When the paper catch tray 8 is closed, the alert is continued to be displayed. On the other hand, when the paper catch tray 8 is opened, the alert display is erased (canceled) (Step S4).

Accordingly, the inkjet copier device 100 of the present embodiment is configured to display the alert when the user fails to open the paper catch tray 8 upon delivering the paper from the manual paper feed tray 5. Therefore, the ink jet copier device 100 can prevent an error due to copying or printing with the paper catch tray 8 closed.

Moreover, since the inkjet copier device 100 can be used as a printer, the inkjet copier device 100 of the present embodiment is configured to display the alert even on a host device such as a computer to which the inkjet copier device 100 is connected. Accordingly, even a host device located apart from the inkjet copier device 100, for example, a computer connected to the inkjet copier device 100 via a network, can be notified that the paper catch tray 8 is closed. Therefore, an error due to printing with the paper catch tray 8 closed can be prevented.

It should be noted that a paper detection sensor may be mounted on the manual paper feed tray 5 so as to display an alert such as "Paper remains in the manual paper feed tray." on the display unit 12 if the paper remains in the manual paper feed tray 5 after the operation of feeding paper is completed.

In addition, with the open/close detection sensor 7 for detecting the opened/closed state of the manual paper feed tray 5, where copying or printing is performed by feeding paper from the paper feed cassette 22 of the main body, when the open/close detection sensor 7 detects that the manual paper feed tray 5 is open, an alert such as "The manual paper feed tray is open." may be displayed on the display unit 12. The alert may be a sound such as a buzzer notifying the user of the status instead of the alert display on the display unit 12. Further, the alert may be issued by both the alert display and the sound. Moreover, it is desirable that the alert be also displayed on the host device such as a computer.

Next, a description is given of a second example of the first embodiment configured to open the paper catch tray 8 automatically. It should be noted that the basic configuration of the second example is the same as that of the first example of the first embodiment. Hence, an overlapping description thereof is omitted.

Figure 5:
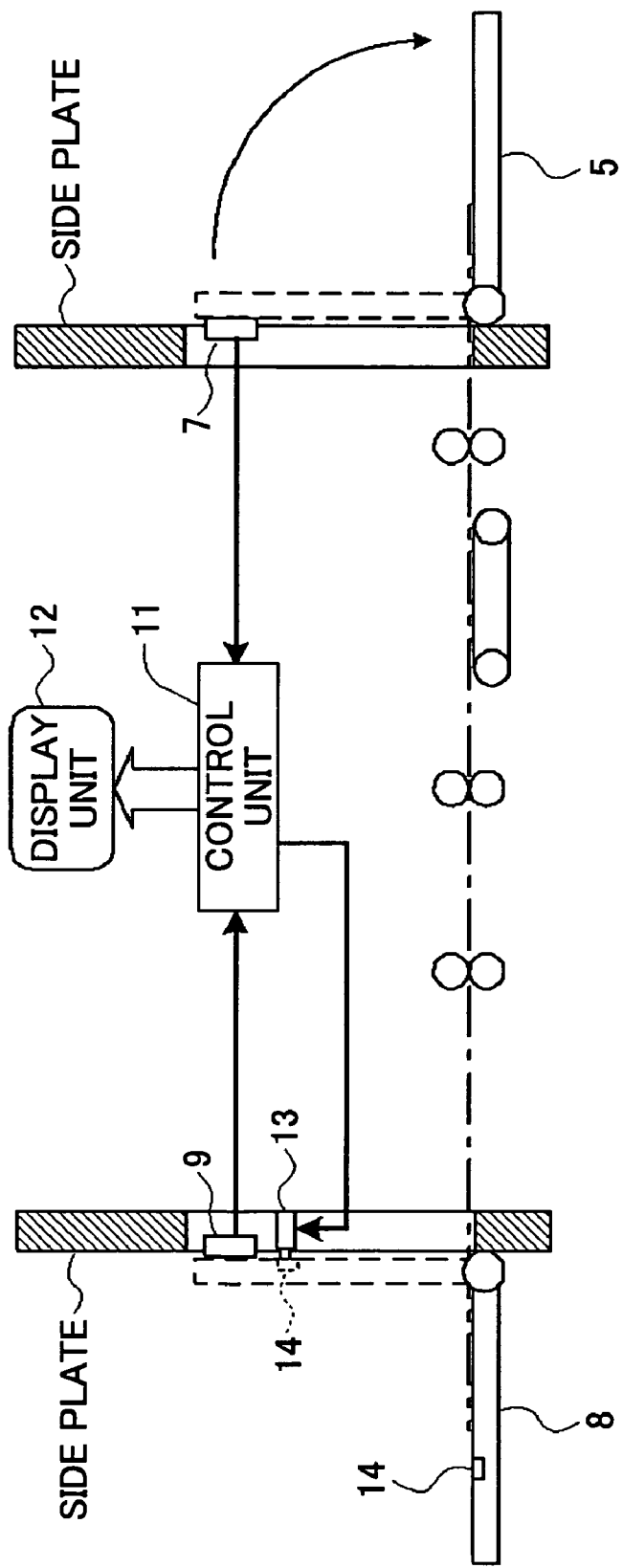
FIG. 5 is a model view illustrating a configuration automatically opening a paper catch tray according to a second example of the first embodiment.

As shown in FIG. 5, in the second example of the first embodiment of the present invention, a solenoid 13 is mounted on a side plate on the paper catch tray 8 side. The solenoid 13 is turned on/off by the control unit 11. An arm of the solenoid 13 is joined to a linkage (drawing thereof is omitted). On the other hand, a magnet plate 14 is provided on the paper catch tray 8 at a position corresponding to the solenoid 13. When the paper catch tray 8 is closed, the magnet plate 14 is attracted by and clings to a magnetic member of the linkage joined to the arm of the solenoid 13 so as to maintain a closed state of the paper catch tray 8. When the solenoid 13 is turned on and the arm thereof is drawn into the solenoid itself, a rotation member (not shown) of the linkage pushes the paper catch tray 8 out. Accordingly, the clinging between the magnet plate 14 and the magnetic member is released due to reduction of magnetic attraction. Therefore, the paper catch tray 8 is automatically opened.

Figure 6:
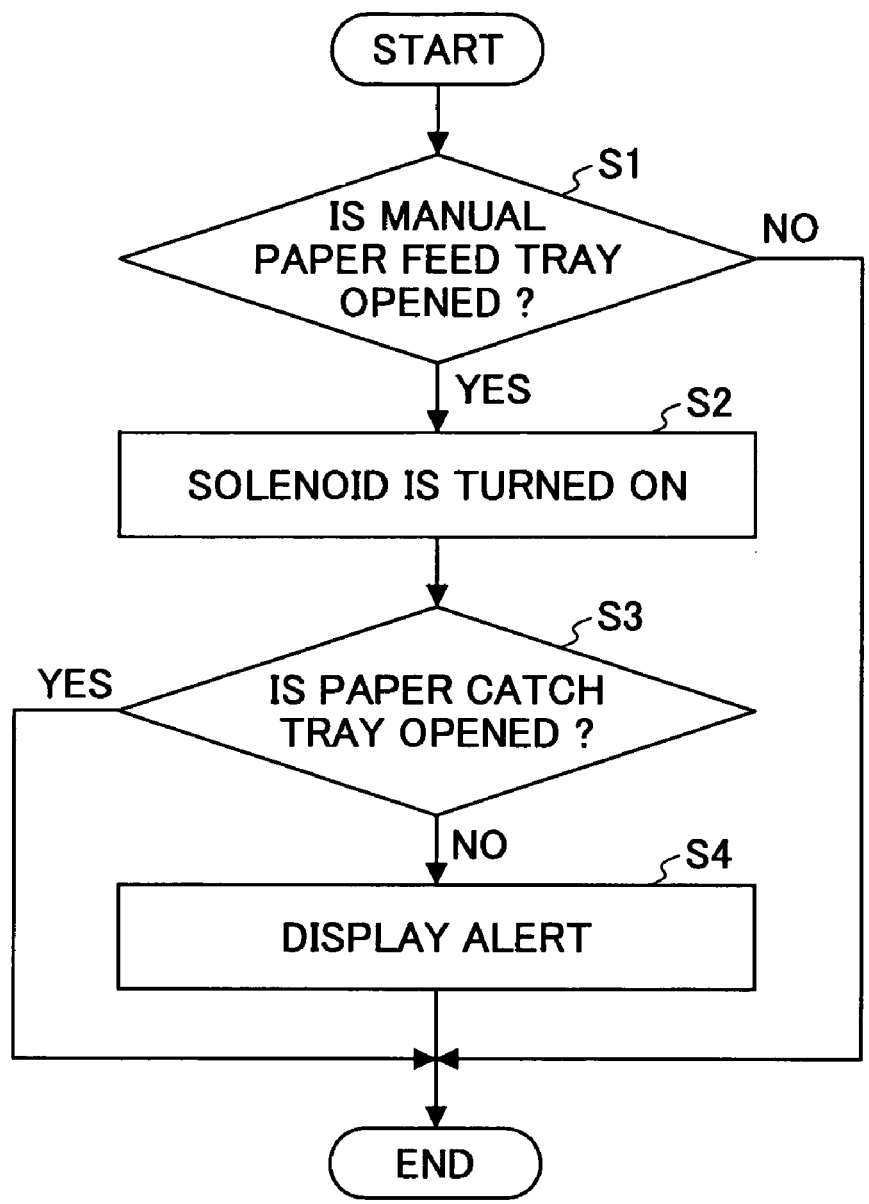
FIG. 6 is a flowchart showing steps of an alert operation according to the second example.

In the second embodiment, as shown in the flowchart in FIG. 6, when the manual paper feed tray 5 is opened (Step S1), the control unit 11 turns the solenoid 13 on (Step S2) so as to open the paper catch tray 8 automatically. Then, the control unit 11 determines whether the paper catch tray 8 is opened according to the output of the open/close detection sensor 9 (Step S3). If the paper catch tray 8 is not opened, an alert is displayed (Step S4). The alert may be a sound such as a buzzer notifying the user of the status instead of the alert display on the display unit 12. Further, the alert may be issued by both the alert display and the sound. Moreover, it is desirable that the alert be also displayed on the host device such as a computer.

As described above, in the second embodiment, when the manual paper feed tray 5 is opened, the paper catch tray 8 is automatically opened. Hence, copying and printing are not performed with the paper catch tray 8 closed. Accordingly, an error of performing the copying and printing with the paper catch tray 8 closed is prevented. Further, since the user does not have to open the paper catch tray 8, operability can be improved.

Next, a description is given of a third example of the first embodiment in which the paper catch tray 8 is configured to be automatically opened and closed. It should be noted that the basic configuration of the third example is the same as that of the first exmaple. Hence, an overlapping description thereof is omitted.

Figure 7:
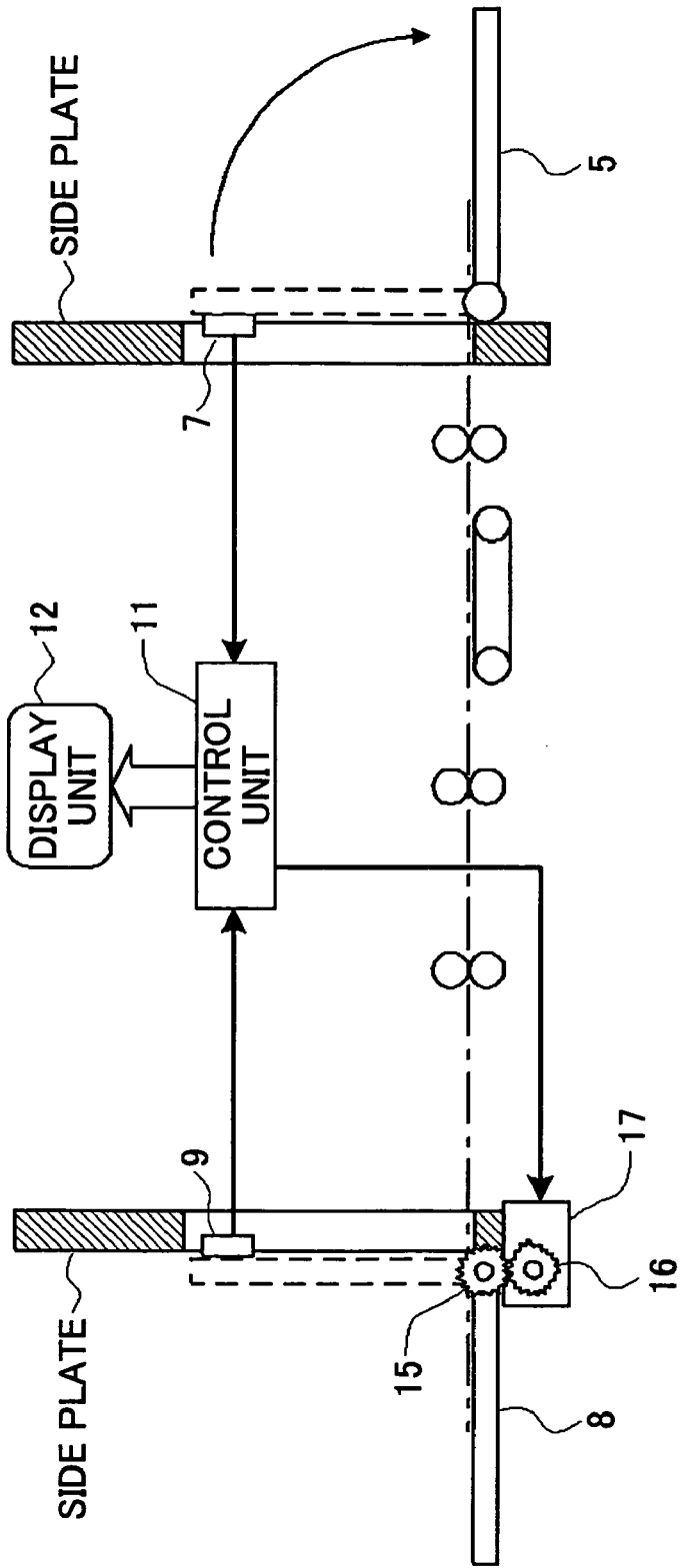
FIG. 7 is a model view illustrating a configuration automatically opening and closing the paper catch tray according to a third example of the first embodiment.

As shown in FIG. 7, in the third embodiment of the present invention, a gear 15 is mounted on an end of a shaft rotatably supporting the paper catch tray 8. A gear 16 is provided so as to engage the gear 15. The gear 16 is mounted on a drive shaft of a motor 17. The motor 17 is controlled by the control unit 11. When the motor 17 rotates in a clockwise direction (normal direction), the paper catch tray 8 is opened. When the motor 17 rotates in a counterclockwise direction (opposite direction), the paper catch tray 8 is closed.

Figure 8:
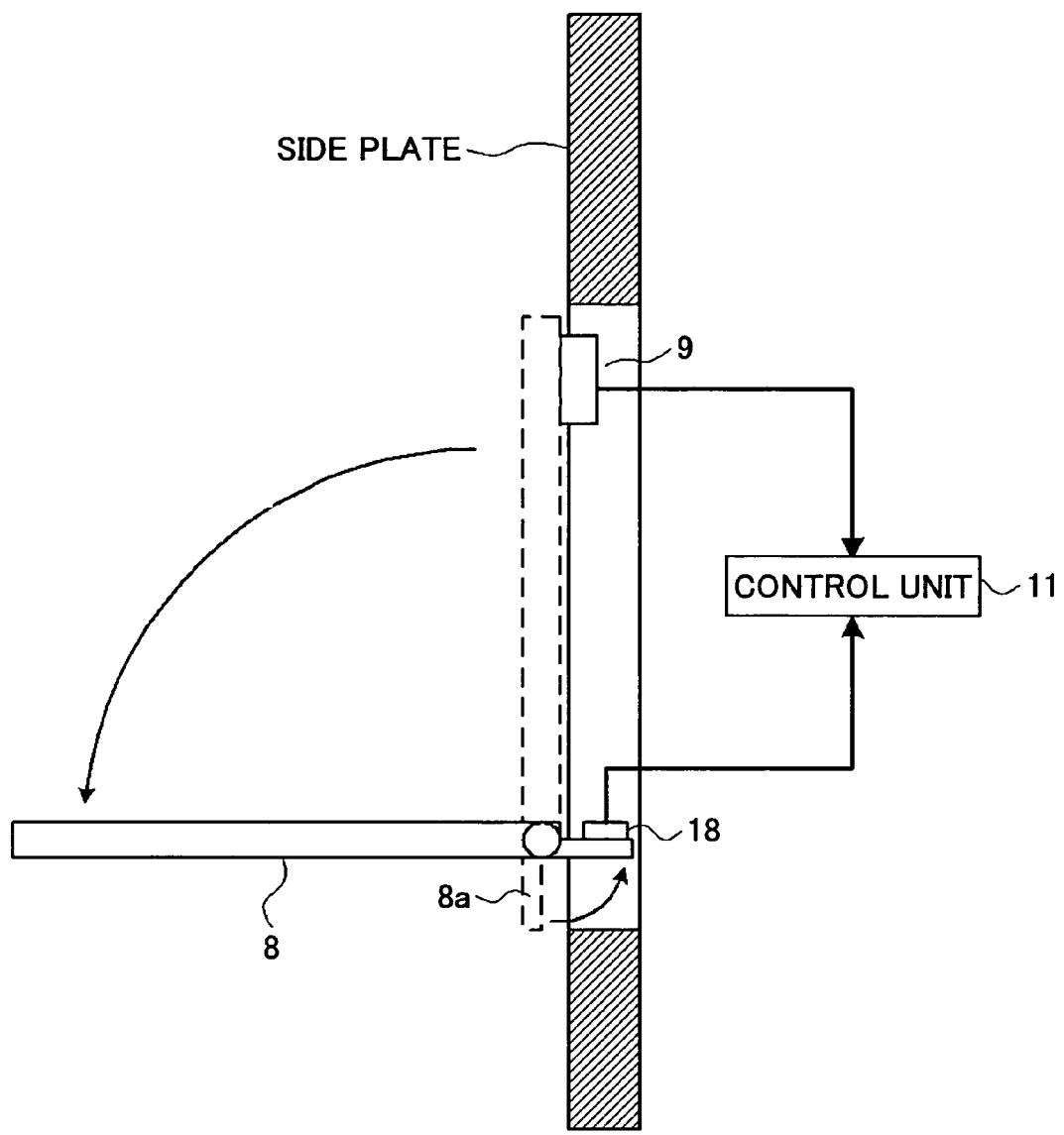
FIG. 8 is an enlarged view illustrating an automatic paper catch tray open/close mechanism.

As shown enlarged in FIG. 8, on a lower end of the paper catch tray 8 extending past the rotation shaft, a protruding part 8a is provided. A switch 18 is provided on the side plate for detecting the protruding part 8a. An output of the switch 18 is supplied to the control unit 11. The protruding part 8a is configured to push the switch 18 when the paper catch tray 8 is completely open. If the paper catch tray 8 is not completely open, a detection signal of the switch 18 is not supplied. Accordingly, it can be determined whether the paper catch tray 8 is completely open according to the output of the switch 18.

Figure 9:
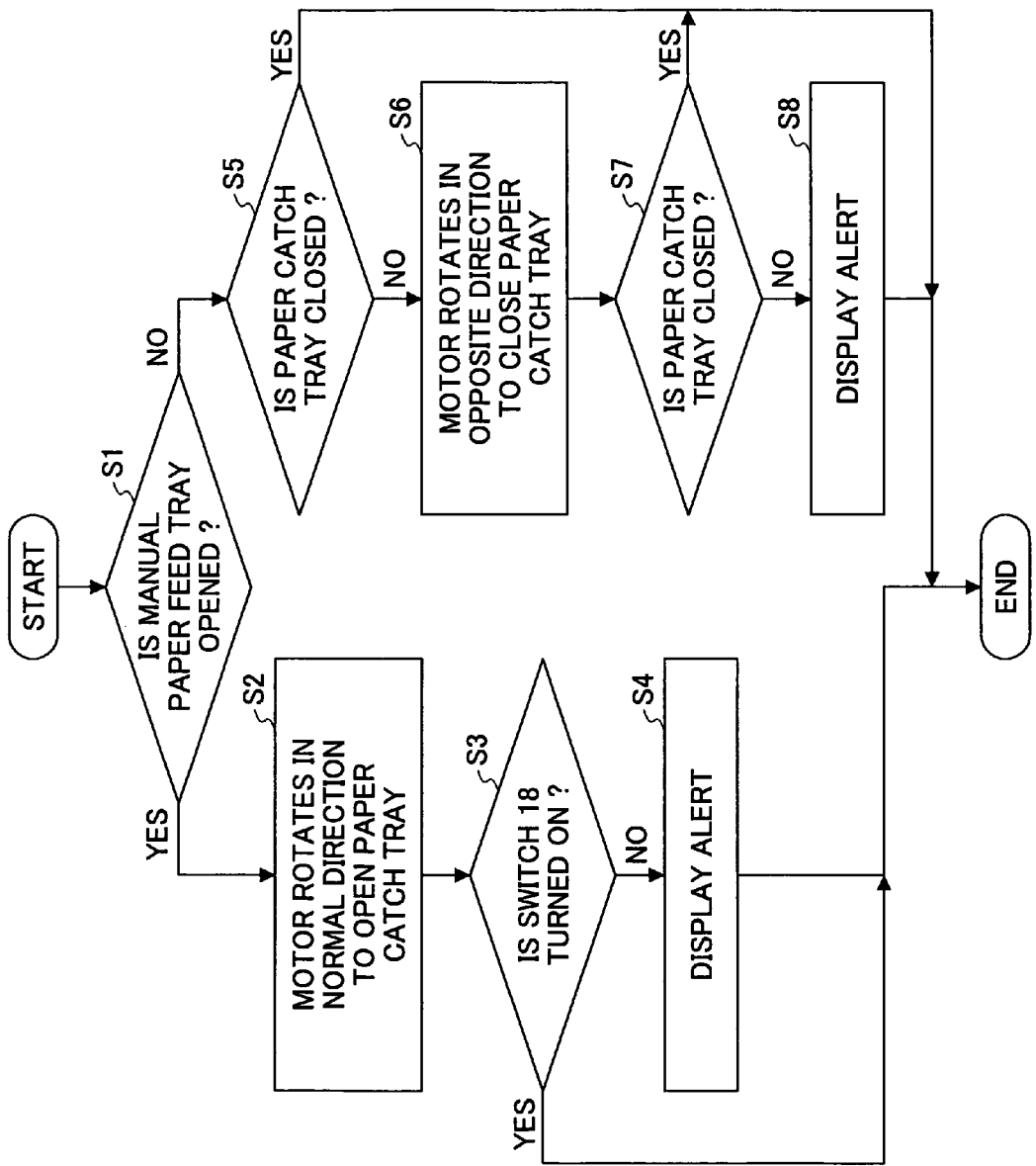
FIG. 9 is a flowchart illustrating an alert operation according to the third example of the first embodiment.

In the third example, as shown in the flowchart in FIG. 9, first, it is determined whether the manual paper feed tray 5 is open (step S1). When the manual paper feed tray 5 is open, the control unit 11 directs the motor 17 to rotate in the normal direction so as to open the paper catch tray 8 (step S2). It is determined whether the switch 18 is turned on (step S3). If the paper catch tray 8 is not completely open, an alert is displayed (step S4). It should be noted that it may be determined whether the paper catch tray 8 is open according to the open/close detection sensor 9, but the output of the switch 18 is better adapted for determining whether the paper catch tray 8 is completely open.

On the other hand, when the manual paper feed tray 5 is closed in step S1, the process proceeds to step S5. In step S5, it is determined whether the paper catch tray 8 is closed according to the output of the open/close detection sensor 9. If the paper catch tray 8 is closed, the process is terminated. If the paper catch tray 8 is not closed, the control unit 11 directs the motor 17 to rotate in the opposite direction so as to close the paper catch tray 8 (step S6). Then, it is determined whether the paper catch tray 8 is closed according to the output of the open/close sensor 9 (step S7), if the paper catch tray 8 is not closed, an alert is displayed (step S8). The alert may be a sound such as a buzzer notifying the user of the status instead of the alert display on the display unit 12. Further, the alert may be issued by both the display and the sound. Moreover, it is desirable that the alert be also displayed on the host device such as a computer.

Accordingly, in the third example, the paper catch tray 8 is opened/closed together with opening/closing of the manual paper feed tray 5. Since neither copying nor printing may be performed when the paper catch tray 8 is closed, an error of copying or printing with the paper catch tray 8 closed can be prevented. In this case, it can be determined whether the paper catch tray 8 is completely open according to the output of the switch 18. Hence, a paper jam which is caused by delivering paper to the incompletely opened paper catch tray 8 can be prevented. Further, since the user does not have to open/close the paper catch tray 8, operability can be improved.

It should be noted that if an automatic open/close mechanism is provided in the manual paper feed tray 5 in the same manner as the paper catch tray 8 so as to open the manual paper feed tray 5 automatically when use of the manual paper feed is directed, the user's labor can be saved so as to improve operability. Further, in a case where the paper is fed from the paper feed cassette 2 of the main body so as to perform copying or printing, when it is detected that the manual paper feed tray 5 is open, the manual paper feed tray 5 may be configured to be closed automatically.

Figure 10:
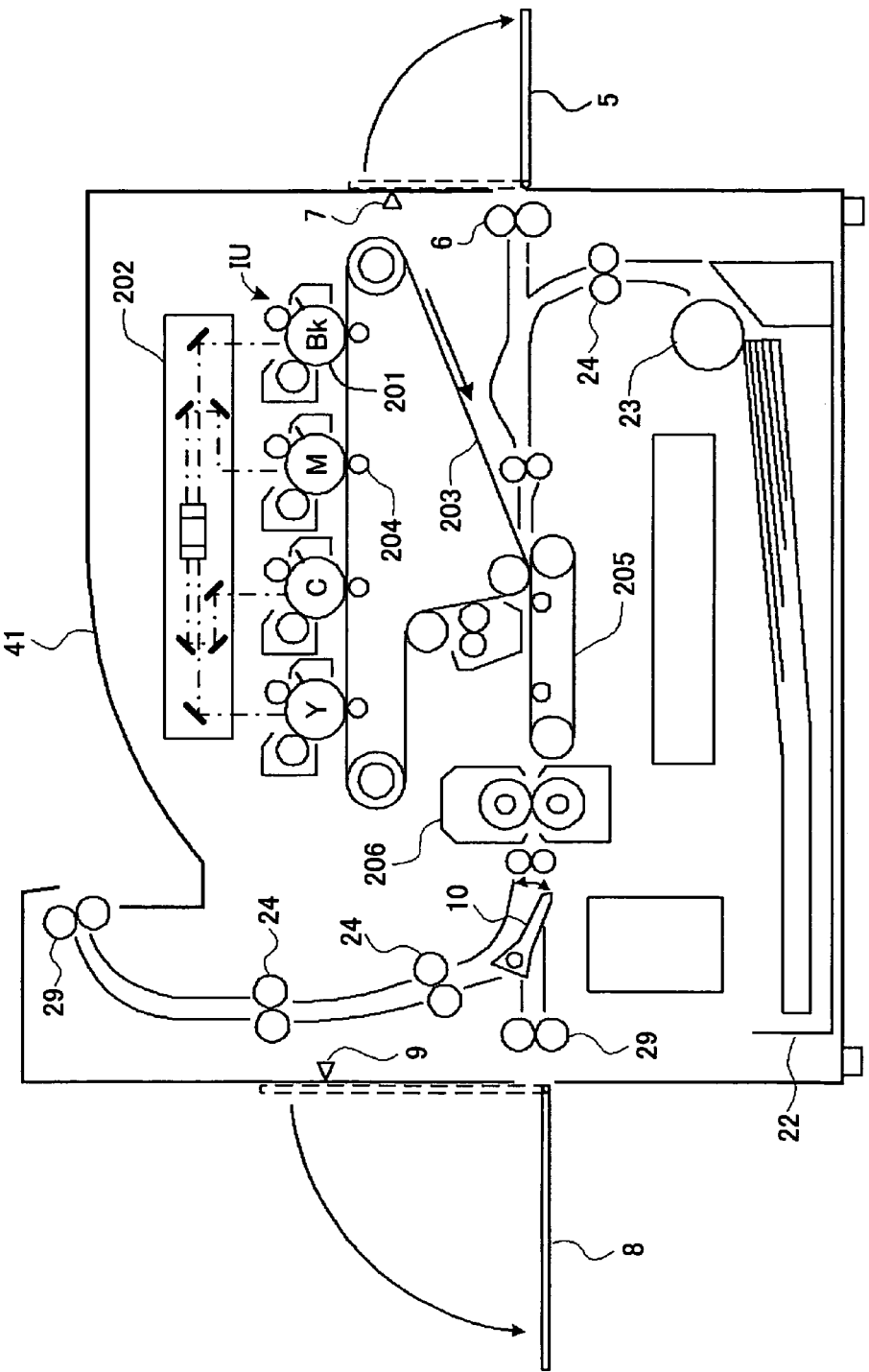
FIG. 10 is a cross-sectional view illustrating a configuration of an image forming device of an electrophotographic system according to a second embodiment of the present invention.

FIG. 10 is a view illustrating an image forming device of an electrophotographic system according to a second embodiment of the present invention. In FIG. 10, the same components as shown in FIG. 1 are given the same reference numerals. Hence, an overlapping description thereof is omitted.

The image forming device 200 shown in FIG. 10, configured as a tandem full color printer, includes four imaging units (IU) forming a line in the vicinity of the center of the device. Each of the imaging units IU comprises a photosensitive drum 201 around which devices necessary for electrophotographic processing are arranged. Each of the imaging units IU has the same configuration except for toner color to deal with. In the present embodiment, the imaging units (IU) are aligned yellow (Y), cyan (C), magenta (M), and black (Bk) from left to right. It should be noted that the order of the colors is not limited to the present embodiment.

Over the four imaging units IU, an optical writing device 202 is provided. Under the four imaging units IU, an intermediate transfer belt 203 is provided. In a loop of the intermediate transfer belt 203, a primary transfer roller 204 is provided at a position opposite to the photosensitive drum 201 of each of the imaging units IU. Under the intermediate transfer belt 203, a transfer conveyor belt 205 is provided, which doubles as a secondary transfer unit. Further, adjacent to the transfer conveyor belt 205, a fixation device 206 is provided.

In the lower part of the device, a paper feed cassette 22 is provided. The upper surface of the device is configured as a paper catch tray 41. On the lateral side of the device, on the right side in FIG. 10, a manual paper feed tray 5 is openably and closably provided. On the other hand, on the lateral side of the device, on the left side in FIG. 10, a paper catch tray 8 is openably and closably provided. Further, plural delivery rollers 24 are appropriately provided at predetermined positions in the paper delivery path. A switching pawl 10 is provided downstream of the fixation device 206. The switching pawl 10 switches the delivery direction of the paper after the paper passes through the fixation device 206 to the paper catch tray 41 on the surface of the device or to the paper catch tray 8 on the lateral side of the device.

In the full color printer 200 as above configured, imaging operations are the same as the publicly known eletrophotographic processing. Hence, a description thereof is omitted.

In the full color printer 200 of the present embodiment, the open/close detection sensor 7 is also provided for detecting an opened/closed state of the manual paper feed tray 5. Further, the open/close detection sensor 9 is provided for detecting the opened/closed state of the paper catch tray 8.

In the second embodiment, in the same manner as the above described first embodiment, when the user fails to open the paper catch tray 8 upon performing printing by feeding paper from the manual paper feed tray 5, an alert is displayed. The configuration and operations thereof are the same as the above described first embodiment with reference to FIGS. 3 and 4. The alert may be a sound such as a buzzer notifying the user of the status instead of the alert display on the display unit 12. Further, the alert may be issued by both the alert display and the sound. Moreover, it is desirable that the alert be also displayed on the host device such as a computer.

In the present embodiment, the paper catch tray 8 can be configured to be automatically opened/closed together with opening of the manual paper feed tray 5 in the same manner as the second example of the first embodiment previously described with reference to FIGS. 5 and 6.

In the present embodiment, the paper catch tray 8 can be configured to be automatically opened/closed together with opening/closing of the manual paper feed tray 5 in the same manner as the third example of the first embodiment previously described with reference to FIGS. 7 through 9.

According to at least one embodiment of the present invention, the alert may be a sound in stead of the alert display on the display unit. Further, these alerts are supplied to the external device so as to alert the user apart from the sheet delivery device.

According to at least one embodiment of the present invention, the sheet delivery device may further include an automatic paper catch tray opening mechanism or an automatic paper catch tray opening/closing mechanism so as to open the paper catch tray automatically. Accordingly, when the user forgets to open the paper catch tray, problems such as a paper jam can be prevented from occurring.

Further, the present invention is not limited to these embodiments, but variations and modifications may be made without departing from the scope of the present invention. Except for the image forming device, the present invention can be applied to a document scanning device constituted by a sheet delivery device including an openable and closable paper feed tray (including a document feed tray), and a paper catch tray.

Moreover, as for the sensors or switches for detecting an opened/closed state of each tray, arbitrary ones such as a photosensor and a micro switch may be used. As for the configuration automatically opening or opening/closing the paper catch tray, an arbitrary configuration may be adopted.

As for the image forming device, it is not limited to the inkjet system, or electrophotographic system. Thus, an arbitrary imaging system can be adopted. Moreover, a number of colors is also arbitrary. Hence, a monochrome device may be used. Furthermore, the present invention is not limited to the printer or copier, but may be a facsimile, or a multifunction machine with plural functions.

The present application is based on Japanese Priority Application No. 2005-070914 filed on Mar. 14, 2005, with the Japanese Patent Office, the entire contents of which are hereby incorporated by reference.

What is claimed is:

1. A sheet delivery device comprising:
   an openable and closable manual paper feeder;
   an openable and closable paper catch tray;
   a first open/close detection unit to detect an opened/closed state of said manual paper feeder;
   a second open/close detection unit to detect an opened/closed state of said paper catch tray; and
   a control unit to issue an alert in response to simultaneous occurrences of both a closed state of the paper catch tray detected by the second open/close detection unit and an open state of the manual paper feeder detected by the first open/close detection unit; and
   an automatic paper catch tray open/close unit to automatically open/close the paper catch tray,
   the automatic paper catch tray open/close unit comprising
      a magnetic member disposed on one of the paper catch tray and a side plate near the paper catch tray, and
      a magnet plate provided on the other of the paper catch tray and a side plate near the paper catch tray,
   wherein the paper catch tray is normally held in the closed state by magnetic attraction of the magnetic member and magnet plate of the automatic paper catch tray open/close unit, and
   wherein when the manual paper feeder is opened, the automatic paper catch tray open/close unit automatically opens the paper catch tray by cancelling the magnetic attraction of the magnetic member and magnet plate, to release the clinging between the magnetic member and magnet plate.

2. The sheet delivery device as claimed in claim 1, wherein said alert is displayed on a display unit.

3. The sheet delivery device as claimed in claim 1, wherein said alert is an alerting sound.

4. The sheet delivery device as claimed in claim 1, wherein after the control unit issues the alert, said alert is cancelled when said paper catch tray is opened.

5. The sheet delivery device as claimed in claim 1, wherein a sheet delivery path from the manual paper feeder to the paper catch tray is formed substantially on a straight line.

6. The sheet delivery device as claimed in claim 1, further comprising an automatic paper catch tray releasing mechanism configured to open the paper catch tray automatically when the manual paper feeder is opened.

7. The sheet delivery device as claimed in claim 1, further comprising an automatic paper catch tray open/close mechanism to automatically open/close the paper catch tray, wherein
when the manual paper feeder is opened, the automatic paper catch tray open/close mechanism opens the paper catch tray.

8. The sheet delivery device as claimed in claim 7, further comprising a third detection unit to detect whether the paper catch tray is completely opened, wherein the control unit detects whether the paper catch tray is completely opened by the third detection unit.

9. The sheet delivery device as claimed in claim 7, wherein when said manual paper feeder is closed, said automatic paper catch tray open/close mechanism closes the paper catch tray.

10. The sheet delivery device as claimed in claim 9, wherein after the automatic paper catch tray open/close mechanism attempts to close the paper catch tray, said control unit detects whether the paper catch tray is actually closed by the second open/close detection unit, and if the paper catch tray is not closed, the control unit issues a predetermined alert.

11. The sheet delivery device as claimed in claim 7, further comprising an automatic manual paper feeder open/close mechanism to automatically open/close the manual paper feeder.

12. The sheet delivery device as claimed in claim 1 further comprising an additional paper catch tray and a switching mechanism, wherein when said openable and closable paper catch tray is open, said switching mechanism switches a conveyance path to output a conveyed sheet on the conveyance path onto the openable and closable paper catch tray, and when the openable and closable paper catch tray is closed, the switching mechanism switches the conveyance path to output the conveyed sheet onto said additional paper catch tray.

13. The sheet delivery device as claimed in claim 1, wherein a paper delivery path between said openable and closable manual paper feeder and said openable and closable paper catch tray is substantially linear, and when the openable and closable manual paper feeder is open and the openable and closable paper catch tray is open, a sheet fed through the manual paper feeder is conveyed on the substantially linear paper delivery path to, and output onto, the openable and closable paper catch tray.

14. The sheet delivery device as claimed in claim 1, wherein when the manual paper feeder is opened, and the automatic paper catch tray open/close unit is unable to open the paper catch tray, the control unit causes the alert to be output.

15. The sheet delivery device as claimed in claim 1, wherein the magnet plate is disposed on the paper catch tray at a complementary position that is complementary to a position of the magnetic member, the paper catch tray is held in the closed state by magnetic attraction of the magnetic member and the magnet plate.

16. An image forming device comprising:
a sheet delivery device including an openable and closable manual paper feeder and an openable and closable paper catch tray; and
an image-forming unit to form an image on a sheet of paper fed from the manual paper feeder,
wherein the sheet delivery device is arranged to deliver the sheet of paper from the image-forming unit to the paper catch tray, and
the sheet delivery device further comprising:
a first open/close detection unit to detect an open/closed state of said manual paper feeder;
a second open/close detection unit to detect an opened/closed state of said paper catch tray;
a control unit to issue an alert in response to simultaneous occurrence of both a closed state of the paper catch tray detected by the second open/close detection unit and an open state of the manual paper feeder detected by the first open/close detection unit; and
an automatic paper catch tray open/close unit to automatically open/close the paper catch tray,
the automatic paper catch tray open/close unit comprising
a magnetic member disposed on one of the paper catch tray and a side plate near the paper catch tray, and
a magnet plate provided on the other of the paper catch tray and a side plate near the paper catch tray,
wherein the paper catch tray is normally held in the closed state by magnetic attraction of the magnetic member and magnet plate of the automatic paper catch tray open/close unit, and
wherein when the manual paper feeder is opened, the automatic paper catch tray open/close unit automatically opens the paper catch tray by cancelling the magnetic attraction of the magnetic member and magnet plate, to release the clinging between the magnetic member and magnet plate.

17. The image forming device as claimed in claim 16, wherein said alert is transmitted to an external device connected to the image forming device.

18. The image forming device as claimed in claim 16, further comprising a paper feeder contained therein, wherein the control unit issues a predetermined alert when the manual paper feeder is opened when a user directs paper to be fed from the paper feeder.

* * * * *